United States Patent [19]
Amano et al.

[11] Patent Number: 5,096,988
[45] Date of Patent: Mar. 17, 1992

[54] PROCESS FOR PREPARING VINYL CHLORIDE POLYMER WITH TWO-STAGE ADDITION OF DISPERSION STABILIZERS

[75] Inventors: Tadashi Amano, Kawasaki; Shigehiro Hoshida, Ibaraki, both of Japan

[73] Assignee: Shin-Etsu Chemical Co., Ltd., Tokyo, Japan

[21] Appl. No.: 564,157

[22] Filed: Aug. 8, 1990

[30] Foreign Application Priority Data

Aug. 9, 1989 [JP] Japan ................................. 1-207624

[51] Int. Cl.$^5$ ................................. C08F 2/20
[52] U.S. Cl. ...................... 526/200; 526/202; 526/344.2
[58] Field of Search .......................... 526/200, 202

[56] References Cited

U.S. PATENT DOCUMENTS

| | | | |
|---|---|---|---|
| 4,533,652 | 8/1985 | Tanaka | 502/167 |
| 4,845,174 | 7/1989 | Amano | 526/62 |
| 4,940,759 | 7/1990 | Yang | 526/62 |
| 4,957,983 | 9/1990 | Hawrylko | 526/200 |

*Primary Examiner*—Christopher Henderson
*Attorney, Agent, or Firm*—Oblon, Spivak, McClelland, Maier & Neustadt

[57] ABSTRACT

A process for preparing a vinyl chloride polymer comprises initiating suspension polymerization with a monomer, etc. being suspended previously in an aqueous medium by used of (A) a particular partially saponified polyvinyl alcohol with high saponification degree and (B) a particular hydroxypropylmethyl cellulose as the first dispersion stabilizer, and adding further the partially saponifice polyvinyl alcohol (A) into the polymerization system at a predetermined timing after the initiation of polymerization. A vinyl chloride polywer with a high bulk density can be obtained, and yet from said polymer, a molded or formed product of high quality with a very small number of fish eyes can be obtained.

7 Claims, No Drawings

PROCESS FOR PREPARING VINYL CHLORIDE POLYMER WITH TWO-STAGE ADDITION OF DISPERSION STABILIZERS

BACKGROUND OF THE INVENTION

1. Field of the Invention

This invention relates to a process for preparing a vinyl chloride polymer, particularly to a process for preparing a vinyl chloride polymer which has a high bulk density, and yet can be processed to give a molded or formed product having a small number of fish eyes.

2. Description of the Prior Art

Vinyl chloride polymer is a useful resin having excellent physical properties, and is utilized widely as rigid materials and soft materials. As the method of processing such vinyl chloride polymer, such methods as calendering, extrusion, injection molding, etc. are generally used. In recent years, in preparation of rigid extrusions, in order to increase the extrusion output of extruders, it is required to develop a vinyl chloride polymer with a high bulk density.

Accordingly, in production of a vinyl chloride polymer by suspension polymerization in an aqueous medium, as the process for obtaining a vinyl chloride polymer with high bulk density, there have been proposed a large number of processes such as the process in which monomer is added in the course of polymerization (Japanese Pre-examination Patent Publication (KOKAI) No. 168008/1984), the process in which a highly saponified vinyl alcohol is used (Japanese Pre-examination Patent Publication (KOKAI) No. 7600/1982), etc.

However, according to the processes described in the above-mentioned Japanese Pre-examination Patent Publication (KOKAI) Nos. 168008/1984 and 7600/1982, although polymers with a bulk density which is high to some extent can be obtained, there is involved the problem that fish eyes are increased in the formed or molded product of the polymer obtained. Also, the bulk density of compositions containing various formulating ingredients added to the polymer obtained is not sufficiently high.

SUMMARY OF THE INVENTION

Accordingly, an object of the present invention is to provide a process for preparing a vinyl chloride polymer which has a high bulk density and also can suppress effectively fish eyes in the formed or molded product.

The present invention has solved the above task by employment of the means of suspending previously vinyl chloride or a monomer mixture containing vinyl chloride in an aqueous medium by use of a dispersion stabilizer comprising a specific partially saponified polyvinyl alcohol and hydroxypropylmethyl cellulose, and also adding a second dispersion stabilizer to the polymerization system at a predetermined timing after the initiation of polymerization.

More specifically, according to the present invention, there is provided a process for preparing a vinyl chloride polymer, which comprises the step of suspending previously a monomer comprising vinyl chloride and an oilsoluble polymerization initiator in the presence of a first dispersion stabilizer in an aqueous medium, and then initiating suspension polymerization, wherein said first dispersion stabilizer comprises (A) a partially saponified polyvinyl alcohol with an average polymerization degree of 1,500 to 2,700 and a saponification degree of 75 to 85 mol % and (B) a hydroxylpropylmethyl cellulose with a methoxy substitution degree of 26 to 30% by weight, a hydroxypropoxy substitution degree of 4 to 15% by weight and a viscosity in 2% by weight aqueous solution at 20° C. of 5 to 4,000 cP, said process comprising the step of adding a second dispersion stabilizer comprising a partially saponified polyvinyl alcohol as specified as (A) above is added to the polymerization system at the point when the polymerization conversion has reached 5% to 50% after the initiation of polymerization.

According to the present invention, a vinyl polymer with a high bulk density can be obtained, which polymer is useful for producing molded or formed products of high quality with a very small number of fish eyes.

DETAILED DESCRIPTION OF THE INVENTION

First dispersion stabilizer

In the present invention, for suspending the monomer in an aqueous medium, the first dispersion stabilizer first added in the polymerization system comprises the (A) partially saponified polyvinyl alcohol and the (B) hydroxypropylmethyl cellulose, as described above.

The first dispersion stabilizer may be normally used in an amount of from 0.03 to 0.1% by weight, preferably 0.03 to 0.06% by weight as the total amount of (A) and (B) based on the charged monomer.

In the first dispersion stabilizer, the weight ratio of the partially saponified vinyl alcohol (A) to the hydroxypropylmethyl cellulose (B), A/B, may be generally preferably from 9/1 to 2/8, more preferably 8/3 to 4/6. If the amount of the partially saponified vinyl alcohol (A) used is more than the above range, fish eyes tend to be undesirably increased. On the contrary, if it is smaller than the above range, bulk density tends to be lowered.

If the partially saponified polyvinyl alcohol (A) to be used for the first suspension stabilizer has an average polymerization degree lower than 1,500 or a saponification degree lower than 75 mol %, the suspension system becomes unstable, whereby the polymer obtained may become coarse particles or scale may deposit within the polymerization vessel. If the average polymerization degree is higher than 2,700 or the saponification degree exceeds 85 mol %, fish eyes will increase in molded or formed products.

Further, if the hydroxypropylmethyl cellulose (B) to be used together with the above partially saponified vinyl alcohol (A) has a methoxy substitution degree lower than 26% by weight, or a hydroxypropoxy substitution degree lower than 4% by weight, also fish eyes will increase in molded or formed products. If the methoxy substitution degree is higher than 30% by weight, or the hydroxypropoxy substitution degree exceeds 15% by weight, the particle size distribution of the polymer particles obtained will become broad.

Second dispersion stabilizer

The partially saponified polyvinyl alcohol (A) and the hydroxypropylmethyl cellulose (B) may be added at the same time in the form of, for example, a mixed solution, or alternatively separately from each other. After the first dispersion stabilizer is added, polymerization of the monomer comprising vinyl chloride is initiated under the suspended state of the first dispersion stabilizer.

In the present invention, after the initiation of polymerization, at the point when the polymerization conversion reaches 5 to 50%, the second dispersion stabilizer comprising a partially saponified vinyl alcohol is added to the polymerization system. The partially saponified polyvinyl alcohol to be used here also has an average polymerization degree ranging from 1,500 to 2,700 and a saponification degree ranging from 75 to 85 mol %, similarly as the above-described partially saponified vinyl alcohol (A), and generally the same one as that used for the first dispersion stabilizer is used. The partially saponified polyvinyl alcohol used as the second dispersion stabilizer may be added in an amount of normally 0.01 to 1% by weight, preferably 0.02 to 0.5% by weight, based on the charged monomer.

If the partially saponified polyvinyl alcohol is added before the polymerization conversion has reached 5%, the particle sizes of the polymer obtained will become undesirably fine. On the other hand, if it is added after the polymerization conversion exceeds 50%, no polymer with high bulk density will be obtained. The polymerization conversion can be estimated substantially correctly from the time elapsed from the initiation of polymerization.

Monomer

The monomer to be polymerized according to the process of the present invention may include, in addition to vinyl chloride alone, monomeric mixtures composed of vinyl chloride (generally 50% by weight or more of vinyl chloride) and other monomer copolymerizable vinyl chloride. The comonomer to be copolymerized with the vinyl chloride includes, for example, vinyl esters such as vinyl acetate, vinyl propionate and the like; acrylic acid esters such as methyl acrylate, ethyl acrylate and the like or corresponding methacrylates; olefins such as ethylene, propylene, etc.; maleic anhydride; acrylonitrile; styrene; and vinylidene.

Oil-soluble polymerization initiator

Examples of oil-soluble polymerization initiators to be used in the present invention may include percarbonate compounds such as diisopropyl peroxodicarbonate, di-2-ethylhexyl peroxodicarbonate, diethyoxyethyl peroxodicarbonate, etc.; perester compounds such as t-butyl peroxyneodecanate, α-cumyl peroxyneodecanate, t-butyl peroxyneodecanate, etc.; peroxides such as acetylcyclohexylsulfonyl peroxide; 2,4,4-trimethylpentyl-2-peroxyphenoxyacetate, etc.; azo compounds such as azobis2,4-dimethylvaleronitrile, azobis-(4-methoxy-2,4-dimethylvaleronitrile), etc.; further potassium persulfate, ammonium persulfate, hydrogen peroxide, etc., and these can be used either singly or as a combination of two or more compounds.

Polymerization conditions

The process for preparing a vinyl chloride polymer of the present invention is practiced under the conditions known per se in the prior art, except that the first dispersion stabilizer is used as described above and that the specific second dispersion stabilizer is added at a predetermined timing after the initiation of polymerization. For example, the amount of the aqueous medium used or the polymerization initiator used per monomer, the polymerization temperature, etc. may be within the ranges employed in the prior art. If necessary, polymerization controllers, pH controllers, etc. can be also added.

EXAMPLES

The present invention is described in detail below by referring to Examples.

Example 1

Into a polymerization vessel made of stainless steel of 2,000-liter inner volume equipped with a stirrer and a jacket were charged 900 kg of deionized water, 180 g of a partially saponified polyvinyl alcohol with a polymerization degree of 2,600 and a saponification degree of 80.2 mol % and 120 g of a hydroxypropylmethyl cellulose with a methoxy substitution degree of 29.2% by weight, a hydroxypropoxy substitution degree of 8.9% by weight and a viscosity in 2% by weight aqueous solution at 20° C. of 49.5 cP, and 240 g of di-2-ethylhexyl peroxodicarbonate. Next, after degassing the inside of the polymerization vessel to a pressure of 50 mmHg, 600 kg of vinyl chloride was charged. Under stirring, the temperature was raised up to 57° C. by passing hot water through the jacket, and polymerization was carried out while maintaining the temperature. Next, when the polymerization conversion reached 30%, 300 g of the partially saponified polyvinyl alcohol which is same as described above was added, and polymerization was continued. When the inner pressure of the polymerization vessel fell to 6.0 kg/cm$^2$.G, after the unreacted monomer was recovered, the slurry of the reaction mixture was taken out from the polymerization vessel, followed by dehydration and drying, to give a polymer.

The bulk density (JIS K 6721), the particle distribution (mesh) of the polymer obtained and the number of fish eyes of a rolled sheet, and the bulk density of the polymer composition containing formulating ingredients such as lubricant, etc. added to said polymer are shown in Table 1.

The number of fish eyes and the bulk density of the polymer composition were measured according to the following methods.

Number of fish eyes in a rolled sheet

An amount 25 g of the formulated product prepared according to the formulation below:

| | |
|---|---|
| Polymer obtained | 100 wt. parts |
| DOP (dioctyl phthalate) | 50 wt. parts |
| Tribasic lead sulfate | 0.5 wt. part |
| Lead stearate | 1.5 wt. parts |
| Titanium oxide | 0.1 wt. part |
| Carbon black | 0.05 wt. part | was kneaded by use of a two roll mill with 6" rolls at 140° C. for 5 minutes, and then formed into a sheet with a width of 10 cm and a thickness of 0.2 mm.

The number of transparent particles per 100 cm$^2$ area of the sheet obtained was counted.

Bulk density of composition

Into a Henscel mixer of 10-liter inner volume were charged 1,000 g of a polymer, 25 g of lead stearate, 7 g of barium stearate and 5 g of tribasic lead sulfate. After the Henscel mixer was preheated by passing steam through its jacket, the mixture was kneaded by rotating the Henscel mixer at a rate of 1,800 r.p.m. When the inner temperature became 120° C., the kneaded product was taken out, cooled to room temperature, and the bulk density was measured according to JIS K 6721.

Example 2

A polymer was obtained in the same manner as in Example 1 except for changing the amount of the partially saponified polyvinyl alcohol added to 240 g and the amount of the hydroxypropylmethy cellulose added to 90 g, and changing the amount of the partially saponified polyvinyl alcohol added when the polymerization conversion reached 30% to 120 g.

The measurement results of bulk density, etc. of the polymer obtained are shown in Table 1.

Example 3

A polymer was obtained in the same manner as in Example 1 except for changing the amount of the partially saponified polyvinyl alcohol added to 105.6 g and the amount of the hydroxypropylmethyl cellulose added to 158.4 g, and changing the amount of the partially saponified polyvinyl alcohol added when the polymerization conversion reached 30% to 1,200 g.

The measurement results of bulk density, etc. of the polymer obtained are shown in Table 1.

Example 4

A polymer was obtained in the same manner as in Example 1 except for changing the time when the partially saponified polyvinyl alcohol to the point when the polymerization conversion reached 10%.

The bulk density, the particle size distribution of the polymer obtained, the fish eyes a rolled sheet and the bulk density of a composition composed mainly of the polymer were measured similarly as in Example 1. The results are shown in Table 1.

Comparative example 1

A polymer was obtained in the same manner as in Example 1 except for adding no partially saponified polyvinyl alcohol in the course of polymerization.

The bulk density, etc. of the polymer obtained are shown in Table 1.

Comparative example 2

A polymer was obtained in the same manner as in Example 1 except for changing the time for adding the partially saponified polyvinyl alcohol to the point when the polymerization degree reached 3%.

The bulk density, etc. of the polymer obtained are shown in Table 1.

Comparative example 3

A polymer was obtained in the same manner as in Example 1 except for changing the time for adding the partially saponified polyvinyl alcohol to the point when the polymerization degree reached 70%.

The bulk density, etc. of the polymer obtained are shown in Table 1.

Comparative example 4

Into a polymerizer made of stainless steel of 2,000-liter inner volume equipped with a stirrer and a jacket were charged 900 kg of deionized water, 324 g of a partially saponified polyvinyl alcohol with an average polymerization degree of 2,600 and a saponification degree of 80.2 mol %, 36 g of a hydroxypropylmethyl cellulose with a methoxy substitution degree of 29.2% by weight, a hydroxypropoxy substitution degree of 8.9% by weight and a viscosity in 2% by weight aqueous solution at 20° C. of 49.5 cP, 120 g of a partially saponified polyvinyl alcohol with an average polymerization degree of 1,890 and a saponification degree of 98.0 mol %, and 240 g of di-2-ethylhexyl peroxodicarbonate. Next, after degassing the inside of the polymerization vessel to a pressure of 50 mmHg, 600 kg of vinyl chloride was charged. Under stirring, the temperature was raised up to 57° C. by passing hot water through the jacket, and polymerization was carried out while maintaining the temperature. When the pressure inside the polymerization vessel fell to 6.0 kg/cm$^2$.G, after the unreacted monomer was recovered, the slurry of the reaction mixture was taken out from the polymerization vessel, followed by dehydration and drying, to give a polymer.

The bulk density, etc. of the polymer obtained are shown in Table 1.

TABLE 1

|  | Examples | | | | Comparative Examples | | | |
| --- | --- | --- | --- | --- | --- | --- | --- | --- |
|  | 1 | 2 | 3 | 4 | 1 | 2 | 3 | 4 |
| polymerization conversion when the partially saponified polyvinyl alcohol was added (%) | 30 | 30 | 30 | 10 | — | 3 | 70 | — |
| Bulk density | 0.572 | 0.575 | 0.570 | 0.570 | 0.525 | 0.509 | 0.524 | 0.570 |
| Undersize distribution of particles (wt. %) | | | | | | | | |
| 60 mesh undersize fraction | 100 | 100 | 100 | 100 | 100 | 100 | 100 | 100 |
| 80 mesh undersize fraction | 93.7 | 90.1 | 92.7 | 95.0 | 82.1 | 98.9 | 81.7 | 80.7 |
| 100 mesh undersize fraction | 62.7 | 59.2 | 61.8 | 67.3 | 48.6 | 89.9 | 48.2 | 47.6 |
| 150 mesh undersize fraction | 11.0 | 9.6 | 10.9 | 13.4 | 8.5 | 34.2 | 8.0 | 7.5 |
| 200 mesh undersize fraction | 0.4 | 0.2 | 0.4 | 1.0 | 0.9 | 19.6 | 0.8 | 0.6 |
| Fish eye number in rolled product | 4 | 5 | 3 | 4 | 3 | 3 | 4 | 350 |
| Bulk density of composition | 0.630 | 0.632 | 0.629 | 0.629 | 0.569 | 0.562 | 0.568 | 0.593 |

Remarks: Sieve is defined in JIS Z-8801

We claim:

1. A process for preparing a vinyl chloride polymer, which comprises the steps of:
    suspending a monomer comprising vinyl chloride and an oil-soluble polymerization initiator in an aqueous medium in the presence of a first dispersion stabilizer, wherein said first dispersion stabilizer comprises (A) a partially saponified polyvinyl alcohol with an average polymerization degree of 1,500 to 2,700 and a saponification degree of 75 to 85 mol % and (B) a hydroxypropylmethyl cellulose with a methoxy substitution degree of 26 to 30% by weight, a hydroxypropoxy substitution degree of 4 to 15% by weight and a viscosity in a 2% by weight aqueous solution at 20° C. of 5 to 4,000 cP;
    initiating suspension polymerization of said monomer; and adding a second dispersion stabilizer comprising a partially saponified polyvinyl alcohol with an average polymerization degree of 1,500 to 2,700 and a saponification degree of 75 to 85 mol % to the polymerization system at the point when the polymerization conversion has reached 5% to 50% after the initiation of polymerization.

2. The process according to claim 1, wherein the partially saponified polyvinyl alcohol (A) and the hydroxypropylmethyl cellulose (B) are added in their total amount of from 0.03 to 0.1% by weight based on the charged monomer before the initiation of polymerization.

3. The process according to claim 2, wherein the partially saponified polyvinyl alcohol (A) and the hydroxypropylmethyl cellulose (B) are added in their total amount of from 0.03 to 0.06% by weight based on the charged monomer.

4. The process according to claim 2, wherein the partially saponified vinyl alcohol (A) and the hydroxypropylmethyl cellulose (B) are used at A/B weight ratio of from 9/1 to 2/8.

5. A process according to claim 4, wherein the partially saponified vinyl alcohol (A) and the hydroxypropylmethyl cellulose (B) are used at a A/B weight ratio of from 8/3 to 4/6.

6. A process according to claim 1, wherein said second dispersion stabilizer is added to the polymerization system in an amount of from 0.01 to 1% by weight based on the charged monomer.

7. A process according to claim 6, wherein the second dispersion stabilizer is added in an amount of from 0.02 to 0.5% by weight based on the charged monomer.

* * * * *